L. Marble,

Grain Basket.

Reissued Mar. 10, 1868.

No. 2,892.

N. PETERS, PHOTO-LITHOGRAPHER, WASHINGTON, D. C.

UNITED STATES PATENT OFFICE.

LANSING MARBLE AND TOWNSEND NORTH, OF VASSAR, MICHIGAN, ASSIGNEES OF LANSING MARBLE.

IMPROVED BASKET.

Specification forming part of Letters Patent No. 34,088, dated January 7, 1862; Reissue No. 2,892, dated March 10, 1868.

*To all whom it may concern:*

Be it known that I, LANSING MARBLE, of Vassar, in the county of Tuscola and State of Michigan, have invented a new and useful Improvement in Splint Baskets; and I do hereby declare that the following is a full, clear, and exact description thereof, which will enable those skilled in the art to make and use the same, reference being had to the accompanying drawings, forming part of this specification, in which—

Figure 1:
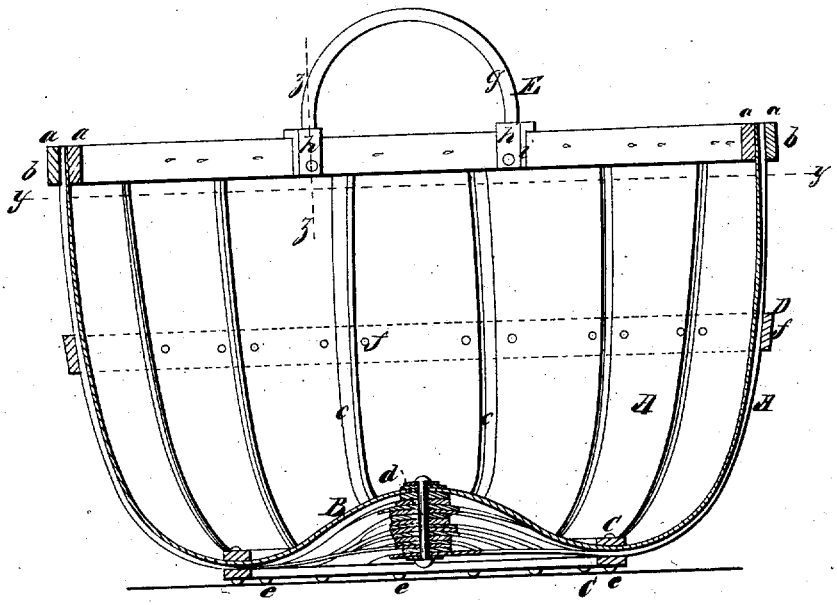
Figure 3:
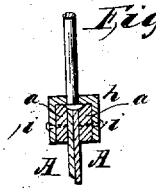
Figure 2:
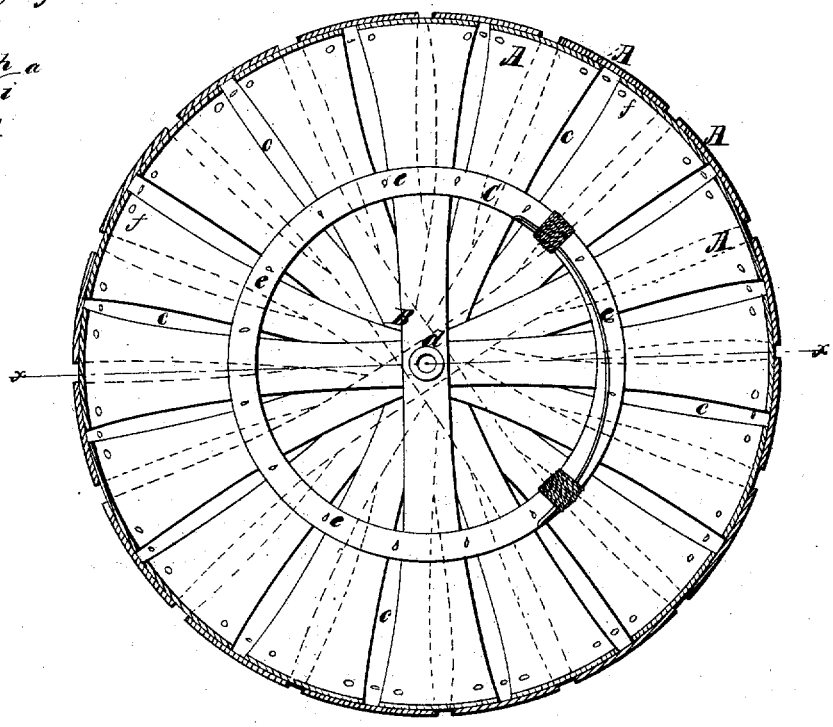

Figure 1 is a vertical central section taken in the line *x x*, Fig. 2; Fig. 2, a horizontal section taken in the line *y y*, Fig. 1; Fig. 3, a section of the top hoops and one of the handles, taken in the line *z z*, Fig. 1.

Similar letters of reference in each of the figures indicate corresponding parts.

My invention is for an improvement in the construction of splint baskets, and is designed to supersede the ordinary woven basket, being of greater strength and durability.

A A′ are two series of splints, made of any suitable wood, extending from side to side of the basket, having their ends secured between the top hoops. These splints overlap each other, so that the inner series cover the joints in the outer series and the outer series cover the joints in the inner series.

B is the bottom of the basket, made in conical form; *c c* spaces or joints between the splints. C C are two hoops, one on the inside of the basket and one on the outside, directly opposite each other, secured in position with nails or rivets, the splints A A′ being between them. These hoops strengthen the bottom of the basket and keep it in proper form, and the outer one is a protection to its bottom.

D is a hoop, which encompasses the basket at a point about half its height. This hoop is secured in position by nails or rivets, which are driven through it and the splints A A′ and clinched.

E E are the handles of the basket; *a a*, top hoops; *b*, nails or rivets by which the top hoops are secured in place holding firmly the ends of the splints A A′; *d*, rivet or bolt passing through the splints A A′ at their point of intersection. This rivet or bolt makes the bottom of the basket more firm. It may be used or dispensed with according to the strength or firmness which may be required.

*e* are nails or rivets with which hoops *c c* are secured in position, supporting and keeping the splints in position; *f*, nails or rivets driven through hoop D and splints A A′ and clinched; *g g*, metal rods bent in semicircular form for handles E; *h*, sockets or dips for the lower end of rods *g g*; *i*, nails or rivets securing sockets *h* to the hoops *a a*, as shown in Fig. 3.

What I claim as my invention, and desire to secure by Letters Patent, is—

1. A basket formed of two series of overlapping splints, A A′, substantially as described, and fastened in any suitable manner.

2. In combination with the above, the hoops *a a*, D, and C C, substantially as and for the purpose specified.

LANSING MARBLE.

Witnesses:

W. LAKE, Jr.,

CHARLES O. BRYCE.